UNITED STATES PATENT OFFICE.

RUDOLF LINKMEYER, OF BRUSSELS, BELGIUM.

MANUFACTURE OF LUSTROUS THREADS OF CELLULOSE.

No. 839,014.             Specification of Letters Patent.             Patented Dec. 18, 1906.

Original application filed March 29, 1905, Serial No. 252,633. Divided and this application filed March 22, 1906. Serial No. 307,404.

*To all whom it may concern:*

Be it known that I, RUDOLF LINKMEYER, a subject of the German Emperor, residing at Brussels, Belgium, have invented new and useful Improvements in the Manufacture of Lustrous Threads of Cellulose, of which the following is a specification.

This application is a division of the application filed March 29, 1905, Serial No. 252,633. After the uncombined ammonia has been withdrawn or eliminated from a cupro-ammoniacal solution of cellulose silk-like threads of sufficient strength and brillancy can be obtained by causing such solution to issue through small apertures into dilute acid—such, for instance, as a twenty-per-cent. solution of sulfuric acid.

The object of the present invention is to obtain threads of far greater brilliancy by treating the same immediately after their formation in dilute acid by means of a reagent having the property of mercerizing—such, for example, as caustic-soda or potash solutions.

By way of example, the following method of operating may be given: A cupro-ammoniacal solution of cellulose from which free ammonia has been withdrawn or eliminated is caused to pass through small apertures into an acid diluted to such a degree that it is not capable of combining instantly with the salts of the cupric solution—for example, sulfuric acid at two to fifteen per cent. Then the threads obtained are passed directly into a lye of hydrate of soda or of potash, more or less concentrated—say from 10° to 40° Baumé—a somewhat strong solution being most suitable. Then after rinsing in water, so as to free them from the caustic solution which still adheres thereto, they are treated in a solution of sulfuric acid of five per cent., for example, which will free them from all the salts that they still contain. Finally they are rinsed in water and dried. It should be noted that the result would not be attained if this treatment were applied after a preliminary drying of the threads on leaving the acid-bath.

Having now described my invention, what I claim as new, and desire to secure by Letters Patent, is—

1. A process for the manufacture of lustrous threads of cellulose by means of a cupro-ammoniacal solution of cellulose, consisting in extracting a portion of the ammonia contained in said solution and then causing the latter to pass in the form of a very fine jet into a very dilute acid and then into a solution of a mercerizing alkali.

2. A process for the manufacture of lustrous threads of cellulose by means of a cupro-ammoniacal solution of cellulose, consisting in extracting a portion of the ammonia contained in said solution, in then causing the latter to pass in the form of a very fine jet into a solution of sulfuric acid at about two to fifteen per cent. and then directly into a solution of hydrate of soda.

In testimony whereof I have affixed my signature in presence of two subscribing witnesses.

RUD. LINKMEYER.

Witnesses:
     H. J. E. KIRKPATRICK,
     L. PIÉRARD.